DISTANCE INDICATING SYSTEM

Filed Sept. 15, 1953 5 Sheets-Sheet 1

FIG. IA

INVENTOR.
C.W. ROESCHKE
BY Roland A. Anderson
ATTORNEY

INVENTOR.
C.W. ROESCHKE
BY Roland A. Anderson
ATTORNEY

INVENTOR.
C. W. ROESCHKE
BY Roland A. Anderson
ATTORNEY

Feb. 9, 1971 C. W. ROESCHKE 3,562,752

DISTANCE INDICATING SYSTEM

Filed Sept. 15, 1953 5 Sheets-Sheet 4

INVENTOR.
C.W. ROESCHKE
BY Roland A. Anderson
ATTORNEY

INVENTOR.
C.W. ROESCHKE
BY
Roland A. Anderson
ATTORNEY

United States Patent Office 3,562,752

Patented Feb. 9, 1971

3,562,752

DISTANCE INDICATING SYSTEM

Conrad Roeschke, Albuquerque, N. Mex., assignor to the United States of America as represented by the United States Atomic Energy Commission Filed Sept. 15, 1953, Ser. No. 382,505
Int. Cl. G01s 9/06
U.S. Cl. 343—13 6 Claims This invention relates to an improved system of apparatus for protecting a radar operated fuse from enemy interference, useful wherever an artillery shell or the warhead of a missile is to be exploded when a desired target distance determined by radar is reached. It is commonly to be feared that an enemy radar apparatus may emit jamming signals intended to cause premature detonation of the explosive, and it is necessary to render such signals ineffective.

Heretofore there have been proposed for this purpose various systems, each having a certain degree of adequacy. Among them is the provision of means for detecting interfering signals and, if such are found, transferring to another type of control. In the system of the present invention there are used two radar transmissions from the attacking weapon, differing in frequency by a fixed amount. Radar pulses are emitted in pairs, successively from one and the other transmitter and separated in time by an interval corresponding to the desired range. The interval between pairs is independently chosen, and each transmitter is alternately first and second in successive pairs.

Pulses from both transmitters are injected into a converter so that alternately each transmitter functions as a local oscillator for the reflected pulse from the other transmitter. There is accordingly no final output pulse to operate a firing circuit or other indicating circuit except when the arrival of a reflected pulse from one transmitter coincides with the emission of a pulse by the other, and this occurs only at the specified range. The jamming signals from the enemy must therefore be the same as those emitted by the attacking weapon, an unlikely circumstance. At target distances less or greater than the specified range there is no output pulse because neither transmitter is emitting at the moment of reception of a reflected pulse from the other.

From the description to follow it will be apparent that the circuit operated by the final output pulse may be one giving any desired kind of indication, for example, altitude above the earth's surface or horizontal distance on land or sea. The invention is thus useful in peace as well as in war.

The invention is clearly applicable to radar measurement of distance to a reflecting object from an observer in any situation and affords substantial immunity to radar interference with such measurement. The pairs of pulses are produced by a trigger multivibrator of which the circuit may be adjusted for any desired time separation of the pulses of a pair and for any desired repetition rate of the pairs subject to the requirement that the interval between successive pairs shall be long compared to that between the members of a pair.

A general object of the invention is therefore to facilitate the radar measurement of distance under circumstances threatening radio interference.

Another object is to provide an improved apparatus adapted to indicate the attainment of a desired range from a target.

Another object is to provide radar apparatus for actuating at a prescribed range the firing circuit of an explosive-carrying projectile.

Another object is to provide for such a projectile a system of radar apparatus for actuating the firing circuit thereof despite interfering radio signals.

Another object is to provide a system of radar apparatus substantially immune to interfering radio signals and having means for determining at any moment the distance from an observer to an observed point.

A specific object of the invention is to provide a system of apparatus including two radio pulse transmitters emitting repetitive pairs of pulses separated in time by a controllable interval and receiving means so arranged that an indication is given of the coincidence of a transmitted pulse from one transmitter with the reception of a reflected pulse earlier emitted from the other transmitter.

Other objects of the invention, as well as those mentioned above, will be obvious from the following description of a preferred embodiment thereof, read with reference to the accompanying drawings, in which:

FIG. 1A is a block diagram of the system of the invention;

In all figures, like numerals designate like elements.

Figure 1B:
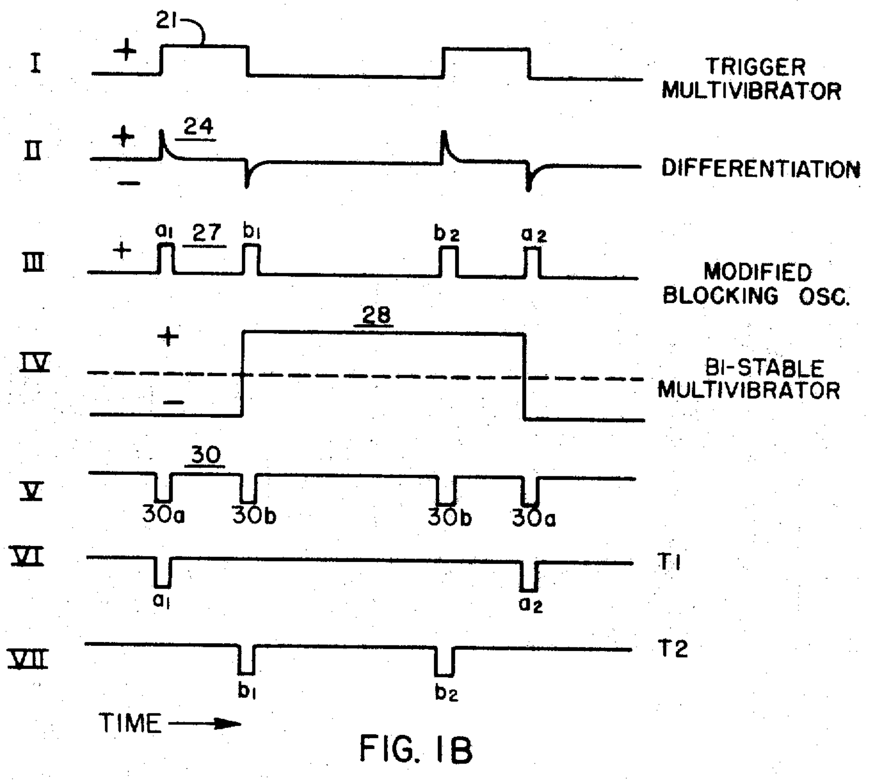
FIG. 1B illustrates the electrical pulses derived from the various blocks shown in FIG. 1A.

Referring first to FIGS. 1A and 1B, the blocks of FIG. 1A are designated by Arabic numerals and in FIG. 1B the corresponding voltage pulses are designated by Roman numerals. Trigger multivibrator 1 is a conventional free-running multivibrator also shown in FIG. 6. It emits square-topped pulses of chosen length and repetition rate as in graph I of FIG. 1B. A conventional differentiator 2 receives the output of trigger 1 and produces the differentiated pulses, graph II, of FIG. 1B. These pulses are transmitted in parallel to blocking oscillator 3 and to bistable multivibrator 4. Oscillator 3 is of known design modified in known manner to produce a positive voltage pulse (graph III) on each occurrence of a differentiated pulse of either polarity. Multivibrator 4 is arranged to produce a continuous train of square-topped pulses alternately positive and negative as in graph IV, reversing from one to the other stable condition each time a negative differentiated pulse of graph II is applied to its input circuit. This, too, is conventional. The pulses of graphs I and II are designated respectively 21 and 24, as in FIG. 5.

It will be noted that the pulses of graph III, all positive, are labeled alternately $a$ and $b$ and that pulses $b_1$ and $b_2$ are generated within one condition of multivibrator 4 while pulses $a_1$ and $a_2$ are within the reverse condition thereof. All pulses $b$ are generated while the pulses of graph IV are positive; all pulses $a$, while such pulses are negative. The "range time" extends from the beginning of the first radio frequency pulse to the end of the second radio frequency pulse of a pair.

The pulses from both oscillator 3 and multivibrator 4 are separately conveyed to electronic switch 5, the circuit of which will be described in connection with FIG. 6. In this switch the pulses IV constitute gating pulses allowing the appropriate pulses III to appear alternately (with reverse polarity as in graph V or, if desired, the original polarity may by known means be preserved) at the input of one and of the other radio transmitters T1 and T2. There the pulses *a* and *b* energize transmitters T1 and T2 respectively (blocks 6 and 7). The pulses of graphs III–V are designated 27, 28 and 30, corresponding to FIG. 6.

The square-topped pulses of graph I have a duration corresponding to a specified distance of which the attainment is to be indicated. The ultimately produced pulses of graph V appear in pairs, one at the beginning and one at the end of the interval covered by the pulses of graph I.

Transmitters T1 and T2 emit short trains of radio waves of frequencies F1 and F2 respectively, each train having the time duration of a pulse of graph III. It is convenient to make F1 and F2 respectively 1000 and 1030 megacycles. The 30 megacycles difference frequency is presently to be explained. For a distance of 5000 feet to be measured by radar the range time is approximately 10 microseconds, and the duration of each pulse I is conveniently less than 1 microsecond. The time scale for FIG. 1B is greatly enlarged for clearness of illustration.

Transmitters T1 and T2 supply their respective outputs to a common antenna 8, and the output of each transmitter is also supplied to a converter 10, to which is connected receiving antenna 9. Thus each transmitter in turn serves as local oscillator for the received reflecting signal emitted from the other. If the signal from transmitter T1 is reflected and reaches converter 10 at the same time as the directly received signal from transmitter T2, converter 10 will transmit to intermediate frequency amplifier 11 the 30-megacycle difference frequency. This operation is conventional and the intermediate frequency of amplifier 11 is made the same as the difference frequency of the radio transmissions, conveniently 30 megacycles.

The output of amplifier 11 is fed to the detector and video amplifier 12 in which a video gate (controlled by differentiator 2) is opened after each positive pulse of graph II, FIG. 1B, and remains open until after the end of the negative pulse. The video gate is shown on FIGS. 2 and 4. The coincident transmitted and reflected pulses of a pair then become a rectified actuating pulse transmitted through the video gate to indicating circuit 13. The operation just described is well known and requires no detailed explanation here.

Indicating circuit 13 is so designed that consecutive video output pulses integrated in amplifier 12 suffice for its actuation, provided such pulses occur for each emission of pulses *a* and *b*. In other words, circuit 13 has a threshold voltage which must be exceeded for the circuit to be actuated. Such arrangement is provided by well known means. If every other video output pulse is omitted the threshold voltage will not be reached and circuit 13 will be undisturbed. The significance of this feature will appear in the description of FIGS. 3 and 4.

Indicating circuit 13 may be designed to fire an explosive when actuated or to flash a light or give an alarm. To provide for the indication of altitude or distance at any desired moment, trigger multivibrator 1 may be adjusted to vary the time spacing between the pulses of a pair until an indication is obtained and a dial graduated in distance units may be traveled over by a pointer accompanying the adjustment of the multivibrator. This is explained in connection with FIG. 5.

Figure 2:
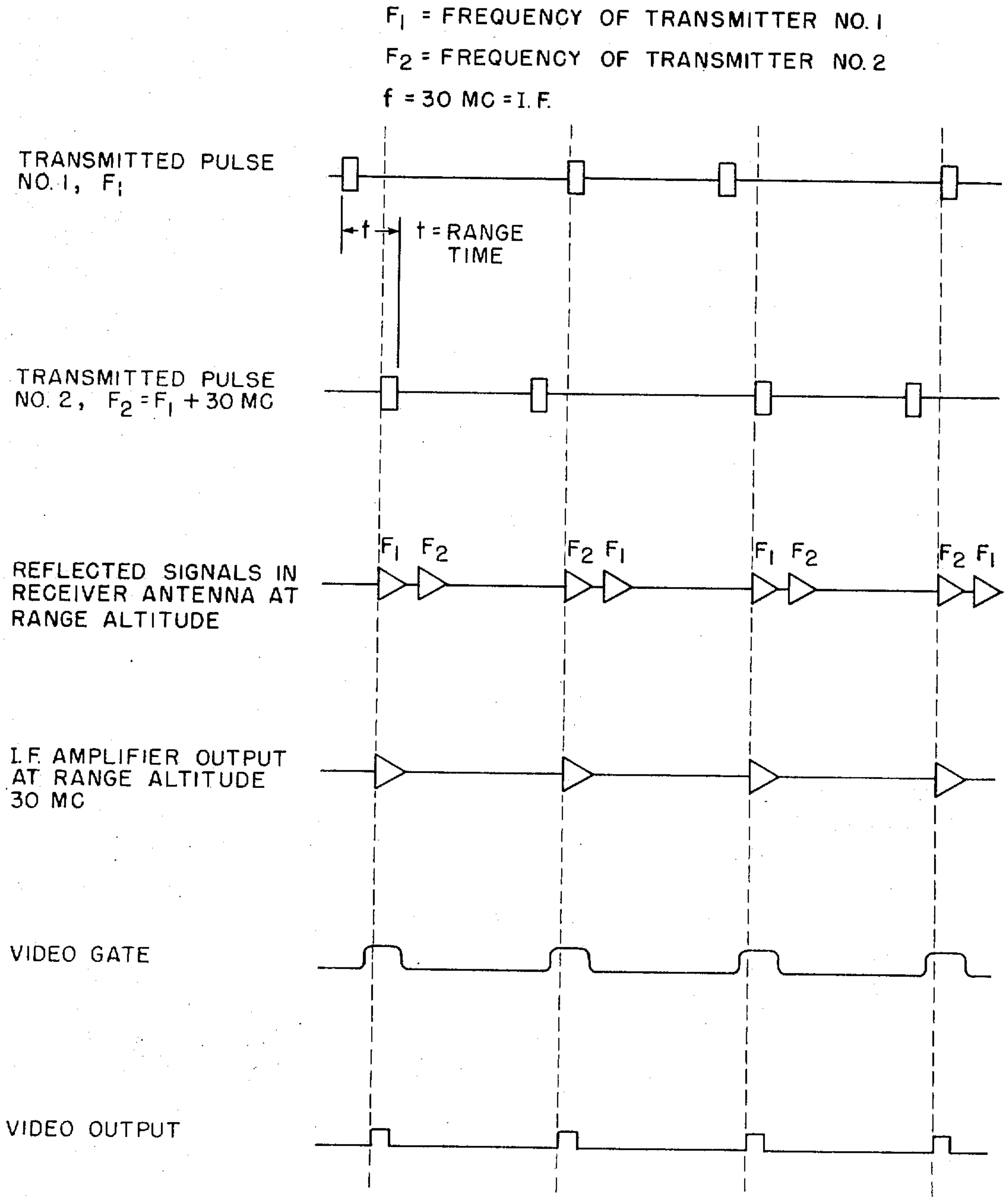
FIG. 2 illustrates the functioning of the system when the carrier thereof is at a specified altitude above the earth's surface.

FIG. 2 exhibits the time relations of the various pulses when the carrier of the system of the invention is at range height above ground. The transmitted pulses of frequencies F1 and F2 are shown as rectangles in the uppermost and the next lower line of the figure. The third line shows as triangles the corresponding reflected pulses. It is observed that at receiving antenna 9 the F1 reflected pulse coincides in time with the directly transmitted F2 pulse. Accordingly, there is an output signal from amplifier 11 which passes through the video gate and appears on the lowest line of the figure as an output pulse which may be integrated with other such to actuate indicating circuit

13. There is such an output pulse for each pair of transmitted pulses. Circuit 13 is therefore actuated to perform whatever function it is designed for.

Figure 3:
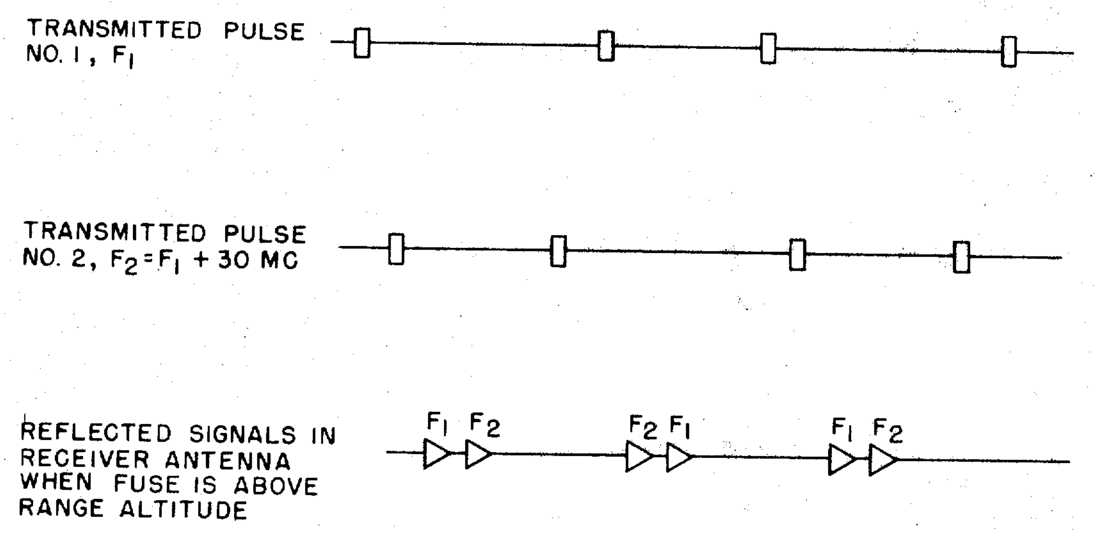
FIG. 3 is similar to FIG. 2 except that the carrier is at greater than the specified altitude.

When the carrier, say a fusing system, is above range altitude the transmitted and reflected pulses appear in time sequence as shown in FIG. 3. Here there is no local oscillator frequency at converter 10 when a reflected signal arrives at antenna 9, hence no output signal to circuit 13.

Figure 4:
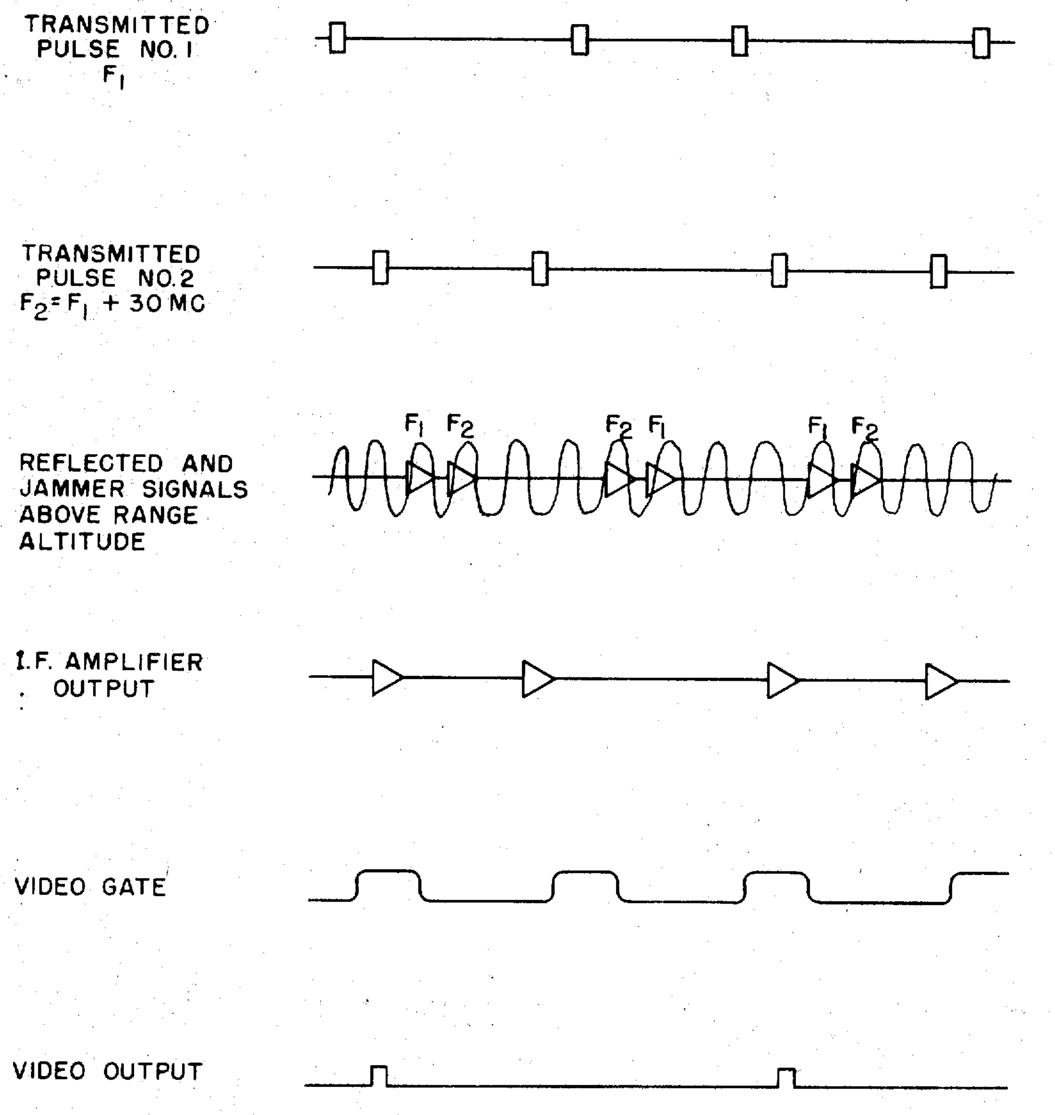
FIG. 4 illustrates the effect of an interfering signal of frequency the same as one of the transmitters of FIG. 1A.

The situation, as in FIG. 3, is shown again in FIG. 4 with the addition of a jammer signal arriving at antenna 9. Assume the jammer signal to be of frequency F1 and continuously present, symbolized by the roughly sinusoidal curve in the third line of FIG. 4. Here at each transmission of a F2 pulse there is a 30-megacycle difference frequency from converter 10; however, the video gate is open only for an interval including the second pulse of a pair (refer to graph III of FIG. 1B). Accordingly, in FIG. 4 the gate is open for the F2 pulses first and third from the left, so that at every other output signal from amplifier 11 the video output pulse fails to appear. As pointed out previously, this deprives circuit 13 of its actuating threshold voltage, and the fuse fails to fire.

Figure 5:
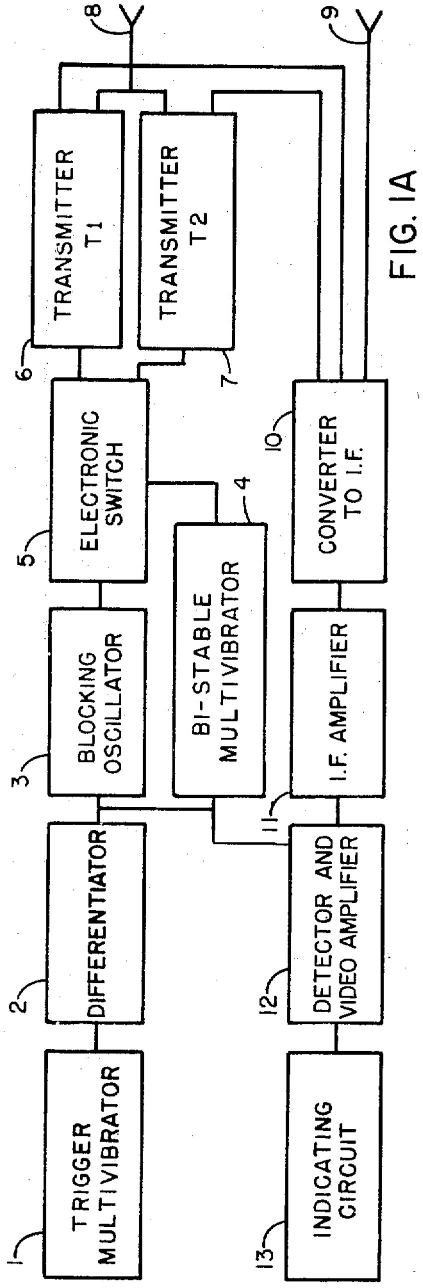
FIG. 5 is a schematic diagram of the circuits of the trigger multivibrator and the differentiator of FIG. 1A.
Figure 5:
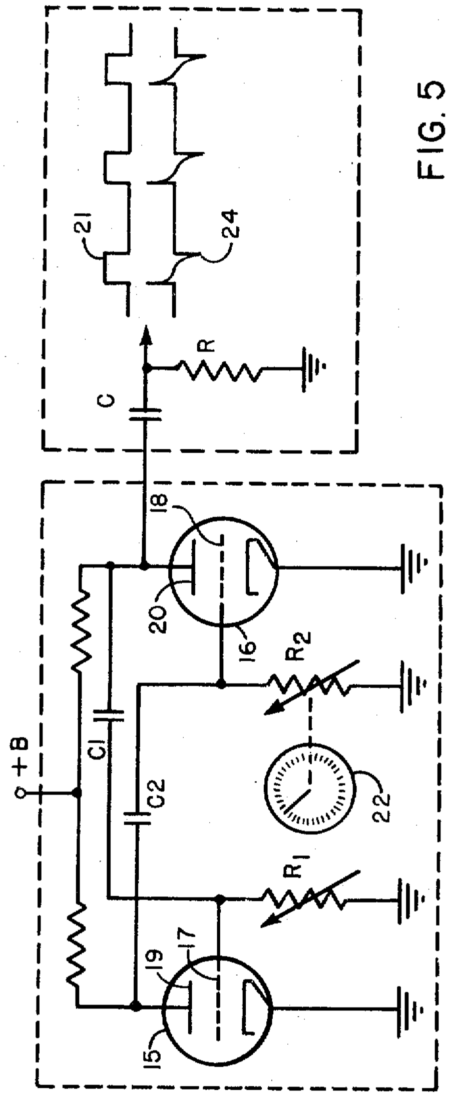

FIG. 5 shows the circuit of multivibrator 1 and differentiator 2 of FIG. 1A. Vacuum tubes 15 and 16, which may be simple triodes, are connected from the grid of each through a condenser to the anode of the other. This is the well known Eccles-Jordan circuit of a free-running multivibrator. The time constant R1C1 (grid 17 connected to anode 20 through condenser C1 and to ground by resistor R1) determines the repetition rate of the pulses 21 appearing at anode 20. The duration of a pulse 21 is controlled by the time constant R2C2 (grid 18 connected to anode 19 through condenser C2 and to ground by resistor R2). These time constants are separately adjustable, and, since the duration of a pulse 21 determines the distance which will be indicated by circuit 13 of FIG. 1A, a dial 22 graduated in distance is swept by a pointer mechanically connected to the control of resistor R2. The series of pulses 21 are those indicated on graph I of FIG. 1B. Block 1 of FIG. 1A is indicated by the dashed rectangle encompassing the multivibrator circuit just described. Similarly, a dashed rectangle designated 2 shows the production of the differentiated pulses 24 from pulses 21. Pulses 21 are applied through condenser C to one end of resistor R, grounded at its other end. There results at the junctions of C and R a positive and a negative pulse corresponding respectively to the rising and falling slopes of pulse 21. These pulse pairs 24 are those of graph II of FIG. 1B. It is necessary that the time constant RC of differentiator 2 be much shorter than the duration of pulses 21.

Figure 6:
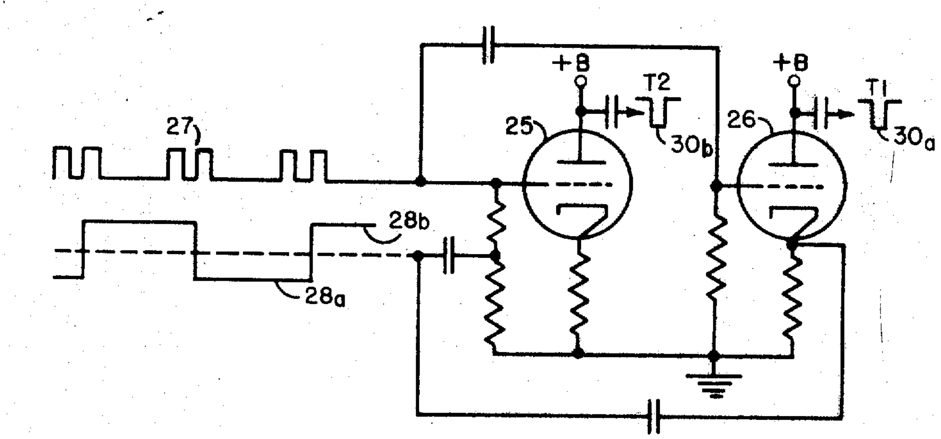
FIG. 6 is a schematic circuit diagram of the electronic switch of FIG. 1A.

FIG. 6 is the diagram of a circuit showing the production from pulses 27 of graph III of transmitter energizing pulses 30, graph V. Vacuum tubes 25 and 26, which may also be simple triodes, are normally nonconducting. To the control grids of both tubes are supplied the pulses 27 of graph III. When tube 25 is made conducting, pulses **30*b* are introduced to energize transmitter T2; likewise, when tube 26 conducts, pulses 30*a* are provided for transmitter T1. Together with pulses 27, the pulses 28 of graph IV are applied to the control grids of tubes 25 and 26. Pulses 28 are applied at the same time to the cathode of tube 26 and in series with pulses 27 to the control grid of tube 25. The arrival at tube 25 of the positive half of a pulse 28 adds to pulse 27 and overcomes the bias of that tube and allows a negative pulse 30*b* to be produced at the anode for transmitter T2. The positive pulse 27 is insufficient to overcome the bias of tube 26. When the negative half of pulse 28 arrives it cancels, in part, the cathode bias of tube 26, and a negative pulse 30*a* at the anode of that tube results for transmitter T1, tube 25** remaining cut off.

Referring again to FIG. 4, it is apparent that for successful interference there must be emitted continuous signals of both frequencies F1 and F2 to cause premature operation of circuit 13. Such operation could also be brought about by high-level jamming signals of frequency either F1 or F2, but the level would have to be comparable with that of the signals directly transmitted to converter 10 from one of the transmitters T1 and T2. Both situations are unlikely. If either frequency is that of the interfering signal the operation will take place at the desired range.

The probability of premature operation due to jamming signals of one frequency, either F1 or F2, is lessened if the level injected from either transmitter to converter 10 is high and the converter characteristic is arranged to reduce conversion efficiency for low level injection. The latter is accomplished in known manner and need not be described herein. One of the advantages of the system is that no local oscillator signal is present in converter 10 when the transmitters are energized; wherefore, the problem of receiver recovery time is reduced.

From the foregoing description of the invention, it will be clear that a radar indicating system is provided, substantially immune from radio interference either intentional or accidental, and adapted for use in automatic fusing of explosive-carrying missiles and equally so in peaceful operations such as navigation on sea or on land. The general principles of the invention are adapted to sonar as well as radar application, with suitable changes obvious to those skilled in the art. In either application the invention provides a measurement of distance from an observer, human or mechanical, to a reflecting object relative to which the observer is in motion.

I claim:

1. For measuring the distance from an observer's position to a radiation-reflecting object, a system of apparatus at the position comprising means for transmitting toward the object pairs of pulses of radiation of different frequencies, the pulses of a pair being separated in time by an interval of adjustable length, means for receiving pulses reflected from the object, means for indicating the time coincidence of transmission of the second pulse of a pair with reception of the reflected first pulse therof and means for adjusting the length of the interval to bring about said coincidence.

2. A system of apparatus for indicating the attainment by a carrier of the system of a specified distance from a reflecting object comprising means for radiating pairs of radio pulses of different frequencies and spaced in time by an interval corresponding to the distance, means for receiving pulses reflected by the object, frequency comparing means supplied jointly by the radiating and by the receiving means to derive a pulse of the difference frequency on the simultaneous arrival at the comparing means of the reflected first pulse and the radiated second pulse of a pair and indicating means responsive to the derived pulse only when such pulse is derived following each radiated pair of pulses.

3. A system of apparatus for measuring the distance of a carrier of the system from a reflecting object comprising means for radiating pairs of radio pulses of different frequencies and spaced in time by an adjustable interval, means for receiving pulses reflected by the object, frequency comparing means supplied jointly by the radiating and by the receiving means and responsive only to the simultaneous supply of the radiated second pulse and of the reflected first pulse of a pair to derive pulses of the difference frequency, means for indicating the occurrence of pulses of the difference frequency and means calibrated in distance units for adjusting the interval to bring about operation of the indicating means.

4. A distance-indicating system operating at a specified distance from an object comprising means for generating a first series of rectangular voltage pulses of one polarity of duration corresponding to the distance and spaced at recurrence intervals greater than the pulse duration, means for differentiating with respect to time the pulses of the first series, means controlled by the differentiating means for generating at the beginning and at the end of each rectangular pulse a momentary voltage pulse of the one polarity, means controlled by the differentiating means for generating a second series of rectangular voltage pulses of duration equal to the recurrence interval and reversing in polarity at the beginning of each such interval, a pair of radio transmitters for generating waves of one and of another frequency, an electronic switch controlled by the third-named generating means for applying alternately to energize the one and the other transmitter the momentary pulses generated with each rectangular pulse of the first series, the order of pulse application reversing for successive pairs of pulses, a common transmitting antenna for the transmitters, a receiving antenna, frequency-converting means supplied from both transmitters directly and from the receiving antenna with waves reflected by the object and effective only when the direct supply from one transmitter coincides in time with the reflected supply from the other transmitter to derive a voltage of the difference frequency therebetween and means for indicating the existence of the derived voltage.

5. A distance-indicating system as in claim 4 including manually operated means for adjusting the duration of the rectangular pulses of the first series, said manually operated means including a dial graduated in distance units.

6. A distance-indicating system as in claim 5 including means for amplifying and rectifying the derived voltage and a channel controlled by the differentiating means for transmitting the rectified voltage to the indicating means, said channel being open only for time intervals including the second pulses of successive pairs of momentary pulses.

References Cited

UNITED STATES PATENTS

| | | | |
|---|---|---|---|
| 3,329,952 | 7/1967 | Bogle | 343—7(PF) |
| 2,409,462 | 10/1946 | Zworykin | 343—7 |
| 2,527,769 | 10/1950 | Sinsheimer | 343—7 |

RODNEY D. BENNETT, Jr., Primary Examiner

T. H. TUBBESING, Assistant Examiner

U.S. Cl. X.R.

343—7, 17.1